(12) United States Patent
Regan et al.

(10) Patent No.: US 9,486,693 B2
(45) Date of Patent: Nov. 8, 2016

(54) SPORTS DATA COLLECTION AND PRESENTATION

(71) Applicant: Catapult Group International Pty Ltd., South Melbourne (AU)

(72) Inventors: Michael Regan, Mount Waverley (AU); Shaun Holthouse, Brighton East (AU)

(73) Assignee: CATAPULT GROUP INTERNATIONAL PTY LTD. (AU)

( * ) Notice: Subject to any disclaimer, the term of this patent is extended or adjusted under 35 U.S.C. 154(b) by 185 days.

(21) Appl. No.: 14/014,840

(22) Filed: Aug. 30, 2013

(65) Prior Publication Data

US 2014/0067098 A1    Mar. 6, 2014

Related U.S. Application Data

(60) Provisional application No. 61/695,460, filed on Aug. 31, 2012.

(51) Int. Cl.
| | |
|---|---|
| *G08C 19/04* | (2006.01) |
| *A63B 71/06* | (2006.01) |
| *G06T 7/20* | (2006.01) |
| *H04N 21/431* | (2011.01) |

(52) U.S. Cl.
CPC ............ *A63B 71/0616* (2013.01); *G06T 7/20* (2013.01); *H04N 21/4316* (2013.01); *G06T 2207/30224* (2013.01)

(58) Field of Classification Search
CPC ................................................ A63B 2220/833
See application file for complete search history.

(56) References Cited

U.S. PATENT DOCUMENTS

| | | | |
|---|---|---|---|
| 5,912,700 A | 6/1999 | Honey et al. | |
| 6,141,060 A | 10/2000 | Honey et al. | |
| 6,744,403 B2 | 6/2004 | Milnes et al. | |
| 7,116,342 B2 | 10/2006 | Dengler et al. | |
| 7,715,982 B2 | 5/2010 | Grenfell et al. | |
| 8,036,826 B2 | 10/2011 | MacIntosh | |
| 8,077,981 B2 | 12/2011 | Elangovan et al. | |
| 8,249,254 B1 | 8/2012 | Daniel | |
| 8,279,051 B2 | 10/2012 | Khan | |
| 8,353,791 B2 | 1/2013 | Holthouse et al. | |
| 8,477,046 B2 | 7/2013 | Alonso | |
| 8,482,612 B2 | 7/2013 | Tamir et al. | |
| 2009/0048039 A1 | 2/2009 | Holthouse et al. | |
| 2010/0283630 A1* | 11/2010 | Alonso | 340/870.11 |
| 2011/0013836 A1 | 1/2011 | Gefen et al. | |

* cited by examiner

*Primary Examiner* — Paul A D'Agostino
*Assistant Examiner* — Ankit Doshi
(74) *Attorney, Agent, or Firm* — The Belles Group, P.C.

(57) ABSTRACT

A system of collecting and displaying statistical performance data of American football or rugby football tactical plays includes
  a) Optional ball tracking sensors
  b) data loggers worn by each player that include accelerometers and location sensors that provide data on duration of play, acceleration, speed, direction of movement, possession of ball, force of impacts
  c) a processor that collects and analyzes the data for each tactical play to determine i) the initial fine of scrimmage for each play, ii) the end of each play, iii) for each player one or more of duration of play, acceleration, speed, direction of movement, possession of ball, force of impacts, and iv) normalizing all the statistics so that all tactical plays and all individual player performances can be compared from the same start point
  d) display means to graphically display the statistics and combine the graphics with video images of the play and players.

9 Claims, 14 Drawing Sheets

SPORTS DATA COLLECTION AND PRESENTATION

PRIORITY

Priority is claimed to U.S. provisional application No. 61/695,460, filed Aug. 31, 2012, the disclosure of which is incorporated herein by reference in its entirety.

FIELD OF THE INVENTION

The field of the present invention relates to the collection and presentation of sports performance data particularly live football game data. The football games of particular relevance are American football and the rugby codes.

BACKGROUND TO THE INVENTION

In all sports and in particular the various football codes coaches and players need statistical data and information related to patterns of play in order to identify aspects of their own teams game and also aspects of their opponent teams games. The spectators particularly those viewing television broadcasts find the addition of such information informative and useful in enhancing their viewing experience.

U.S. Pat. No. 5,912,700 discloses a camera and sensor based system for adding graphics and enhancing video images of a sporting event.

U.S. Pat. No. 6,141,060 discloses a method for improving the presentation of an American football game by adding a line to a video image indicating the first down position of the play. Field of view sensors are used in conjunction with cameras. This has been regarded as a useful addition to TV broadcasts.

U.S. Pat. Nos. 6,744,403 and 8,077,981 disclose a method of presenting motor racing video broadcasts which include collecting GPS data conducting statistical analysis and adding a graphic to a video image.

U.S. Pat. No. 7,116,342 discloses a method of inserting perspective correct content into an image sequence.

U.S. patent publication No. 2011/0013836 discloses a method of image analysis to assist in game strategy analysis of ice hockey games.

U.S. Pat. No. 8,249,254 discloses a system of collecting statistics by using a data logger on each player to transmit data to remote terminal for review by coaches.

U.S. Pat. No. 8,279,051 discloses a method of collecting game statistics using RF technology and a. base station to track players and enhance information to coaches.

U.S. Pat. No. 8,482,612 discloses a system using video camera clusters and a ball tracking technology for use with football games.

U.S. Pat. No. 8,477,046 discloses a system for collecting sports data using, sensors on participants and in the ball and using the information for analysis and camera positioning.

In spite of these developments there is still a need to provide additional analytical information and graphical displays for use by coaches and broadcasters.

It is an object of this invention to provide an improvement in the analysis and graphical presentation of American Football and the rugby codes.

SUMMARY OF THE INVENTION

To this end the present invention provides a system of collecting and displaying statistical performance data of football tactical plays which includes:

a) player data loggers worn by each player that include accelerometers and location sensors that provide data on duration of play, acceleration, speed, direction of movement, possession of ball, force of impacts b) a processor that collects the data from the sensors and from other sources and analyses the data for each tactical play to determine i) the initial line of scrimmage for each play, ii) the end of each play, iii) for each player one or more of start position and end position, duration of play, acceleration, speed, direction of movement, possession of ball, force of impacts, and iv) normalizing all the statistics for each tactical play relative to the initial scrimmage line or a players start point, so that all tactical plays and all individual player performances can be compared from the same start point c) display means to graphically display the statistics and combine the graphics with video images of the play and players.

This invention will be described in relation to American football as presented by the NFL but is also applicable to other territorial football games like rugby league and rugby ration. The insight of this invention for the NFL is to represent each play relative to the scrimmage line of that play so that each key player's movement and the movement of the ball is shown relative to the scrimmage line. This normalisation of the data from each play allows statistical analyses of all plays to be more meaningful no matter where the play took place on the playing field.

The plays may also be normalized with respect to the players starting position in direction 'y' (if x is the direction of play). Accordingly the players positions are normalised in the direction of play relative to the scrimmage line and also at right angles to the direction of play. So it doesn't matter where relative to the line of scrimmage a player (e.g. a wide receiver) started—all his plays get normalised for his lateral position also.

Where the statistical data is used for broadcasting purposes some of the information used to determine the scrimmage line location at the start and end of each play may come from an external source such as the referee system used by the broadcaster.

The system may also incorporate ball tracking sensors in the ball to provide additional information on the movement of the ball and its possession by players.

The player data loggers used are preferably those described in U.S. Pat. Nos. 7,715,982 and 8,036,826. The position of the ball may be tracked using the ball tracking system disclosed in U.S. Pat. No. 8,353,791. The disclosure of those patents is incorporated into the disclosure of this specification.

It is preferred however to use a wireless triangulation system for the NFL as the hardware is usually in place in the major venues and given the accuracy required the triangulation method is preferred.

By using the time clock, and the GPS and accelerometer data, as well as the ball location data, the position of all players on each team and which quarterback has the ball, can be determined. Using this data at the start of the play, the position of the scrimmage line can be determined and then all subsequent movements of players are plotted relative to that scrimmage line.

The analyses that may be made are 1. tactical plots of quarterback and receiver movements and distances travelled as well as ball movement; the plots may be colour coded to show consequence of each play 2. line of scrimmage statistical analysis to analyse the performance of the scrimmage players on each team, including offensive line impact strengths for individual and multiple plays; individual line man stats
3. quarterback pass statistics per play, averaged over multiple plays for this game, or this opposition or all games
4. receiver run stats and running back rushing play stats
5. jamming stats for individual players or teams
6. heat maps showing time at a part of the field is interesting especially for players on the defensive side. These heat maps may be normalised with respect to the line of scrimmage (and normalised in the y direction). This allows linking several of heat or coverage maps of different players together, to display overlapping coverage of the field. Heat maps have been used in other sports, but again the key inventive step is normalising them with respect to the line of scrimmage.
7. Display the effective coverage area that a receiver can cover if the ball is passed in their direction from the quarterback. This allows the viewer or coach to see which receivers have the largest effective range to receive the ball and to evaluate where the passer of the ball (quarterback) has the best opportunity for passing the ball.
8. Pocket analysis—the pocket in American football is the area behind the line of scrimmage in which the quarterback can operate to pass the ball. The pocket is collapsed if a defender penetrates or passes around the scrimmage line or the quarterback runs out of the pocket. The analysis can report the size of the pocket and the time from the snap to when it collapses.
9. The effective coverage area and pocket analysis leads on to analysis of passing effectiveness and quality of quarter backs decision making.

BRIEF DESCRIPTION OF THE DRAWINGS

Preferred embodiments will now be described with reference to the drawings in which.

DETAILED DESCRIPTION OF THE PREFERRED EMBODIMENTS

The data provided for the graphical representations is collected using player data loggers described in U.S. Pat. Nos. 7,715,982 and 8,036,826 the ball tracking system disclosed in U.S. patent publication No. 2009/0048039.

With respect to FIGS. 1-9 the player data loggers record for each player their movements and actions such as passing the ball, receiving the ball, impacting or tackling another player or being blocked or tackled as well as acceleration, distance covered, and the route taken across the playing field. These statistics are partly processed in the data logger including signals received from the ball to show possession or contesting of the ball. The signals are transmitted to a central computer where the data is processed to provide raw statistics for each player. The data for the time period of each play is normalised by determining for each play the scrimmage line between the two teams prior to the play commencing and then relating position of each player along X and Y axes relative to the scrimmage line (where X is the direction of play) so that each subsequent play can he compared on the same basis.

The central computer will have access to statistical data for all teams and for all prior games so that competition averages can be obtained and players performances and team performances compared to previous games.

Figure 1:
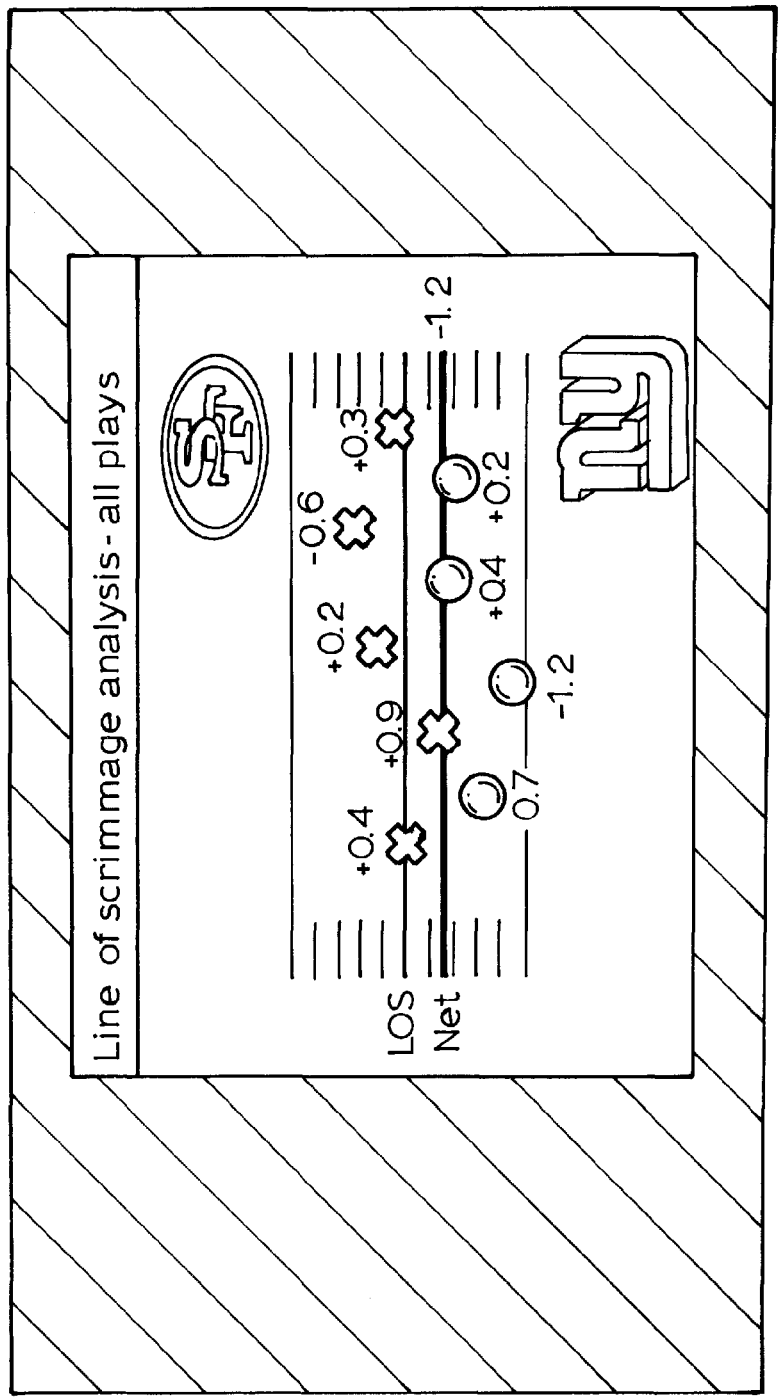
FIG. 1 illustrates a graphical depiction of the position of players after each play relative to the line of scrimmage (LOS)

In FIG. 1 the LOS analysis allows spectators and coaches to see who is winning the LOS as the averages or individual play results show the net movement after collision for the so called unskilled positions in the game (like offensive and defensive linemen). In the graph shown the analysis is for all plays up to that point in the game.

Figure 2:
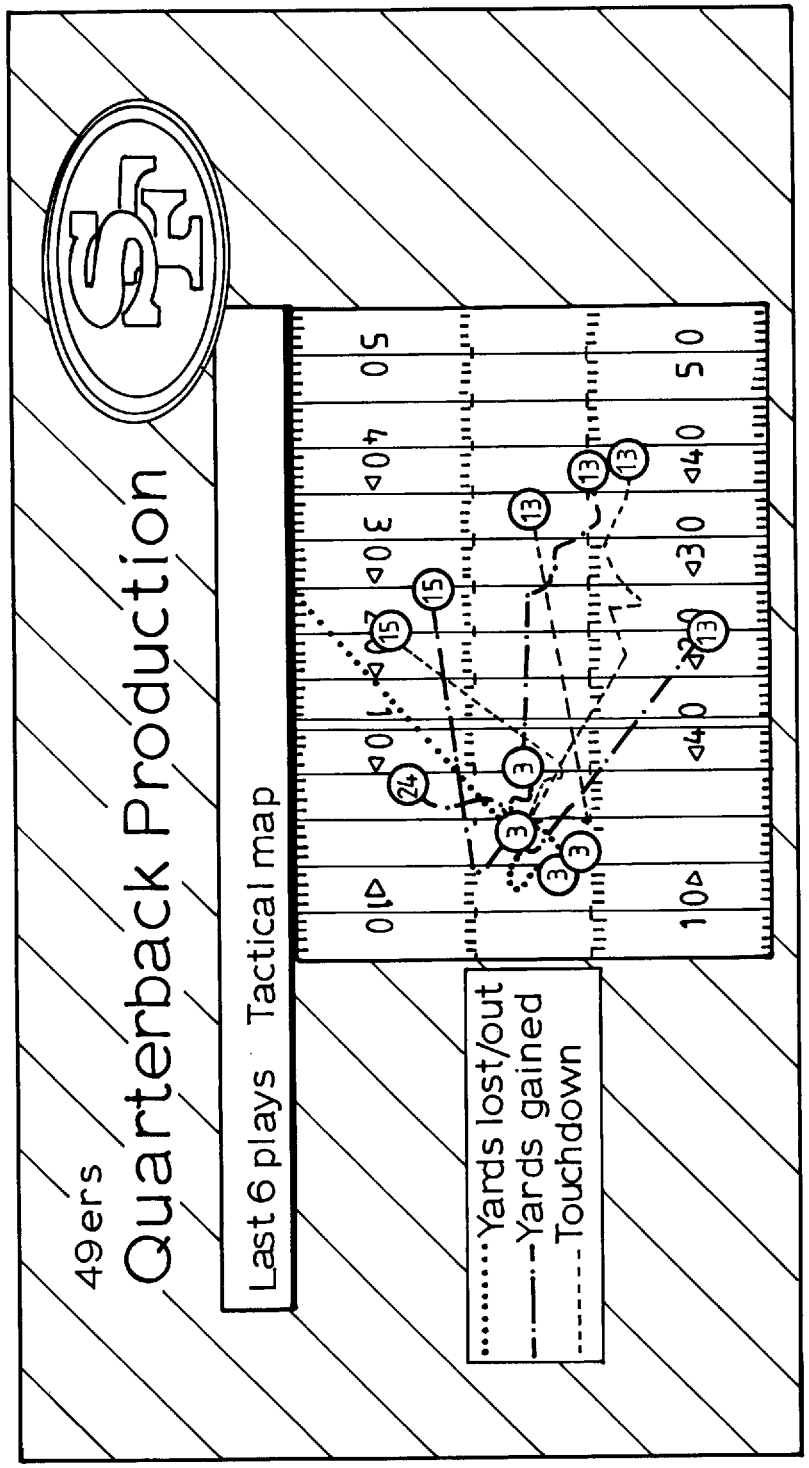
FIG. 2 illustrates tactical plots illustrating the movement of the ball from the quarter back to the receiver.

FIG. 2 provides tactical plots for a particular quarterback in offensive plays for the previous 6 plays up to that point in the game. The lines show the movement of the ball while it is held by the quarterback, then in flight when it is passed and then in the possession of the receiver from when he receives the ball to when he touches down or is tackled or moves out of the field of play. Thus all plays can be shown in this way or just forward half plays, or back half plays, one or more rushing, plays and one or more passing plays.

Figure 3:
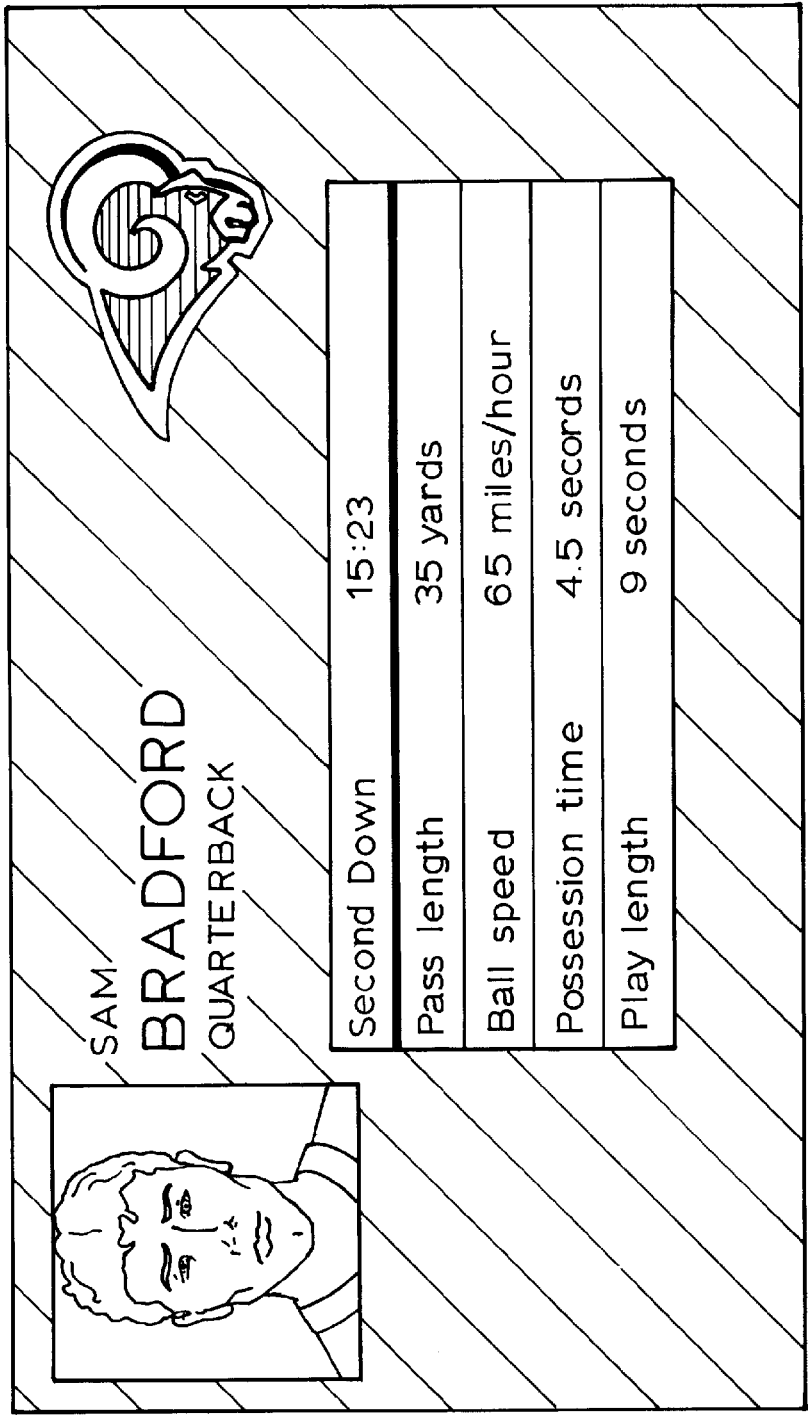
FIG. 3 shows a statistical breakdown of various aspects of a quarterbacks play.

FIG. 3 is a breakdown of statistics for a quarterback showing statistics for each play of pass length, ball speed, possession time and play length. These can be displayed as averages for a section of past plays or of all plays for that game or for all games for the season or the career of the quarterback. These statistics may also be compared to League averages for all quarterbacks.

Figure 4:
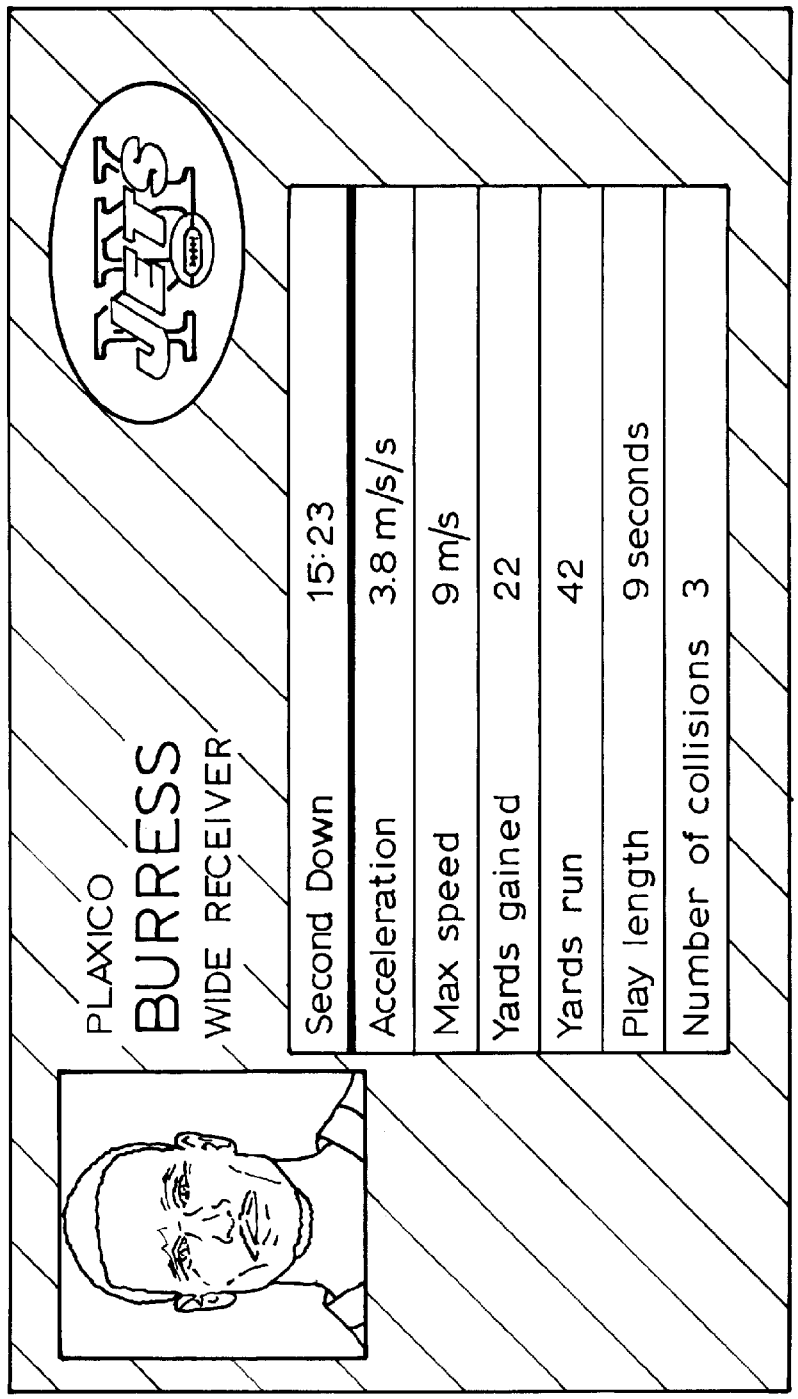
FIG. 4 shows similar statistics for a wide receiver.

FIG. 4 is similar to FIG. 3 except it is designed for a receiver and may be presented in as many variations as for FIG. 3.

Figure 5:
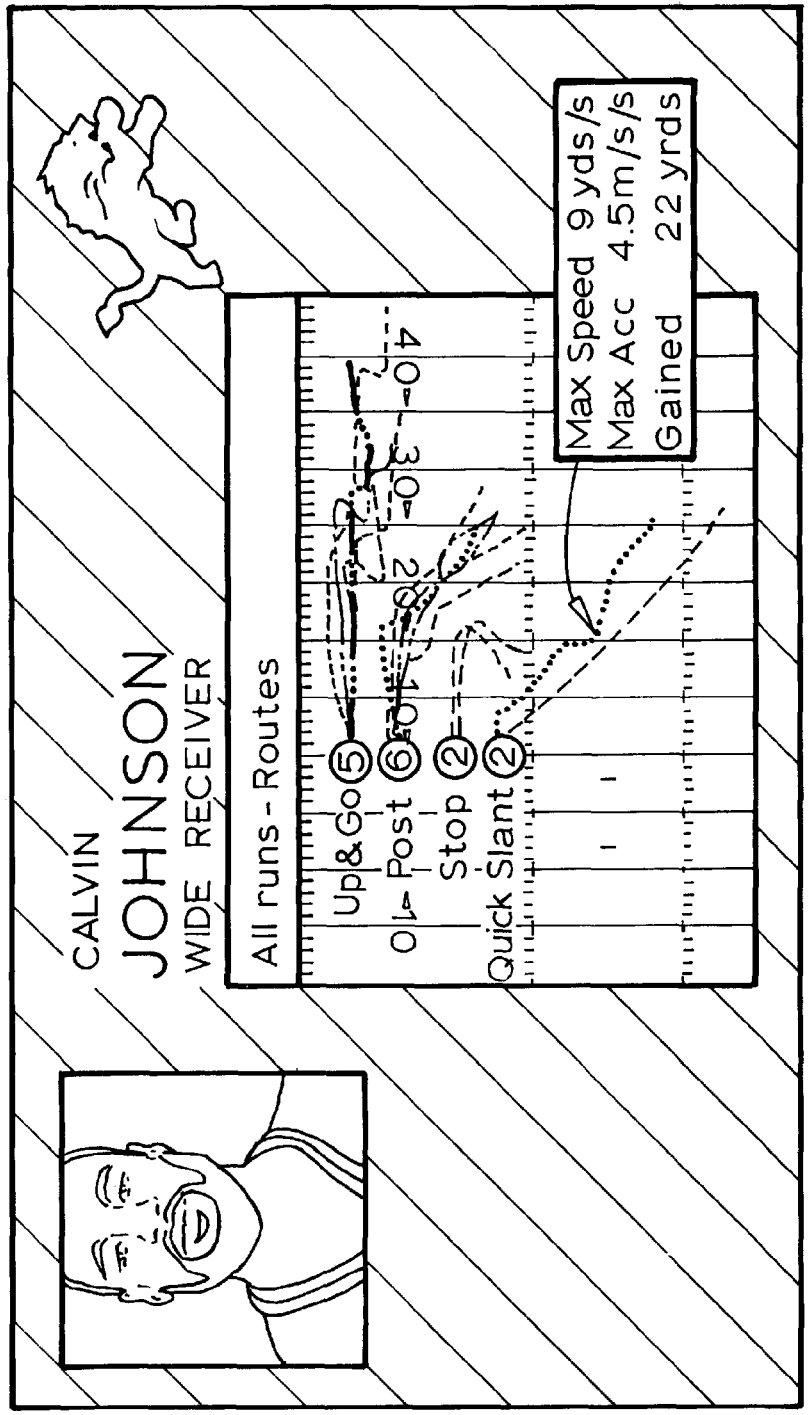
FIG. 5 illustrates tactical plots illustrating the movement of a wide receiver.

FIG. 5 is similar to FIG. 2 except that the plots are for a wide receiver showing as many runs and routes as desired. The runs may be colour coded showing velocity profile, outcome and on the screen the program can allow a mouse over function to highlight a list of statistics for each run. The wide receiver plots may be normalised to the scrimmage line or to the wide receivers start point at the beginning of each play so that the route distance and times may be more easily compared.

Figure 6:
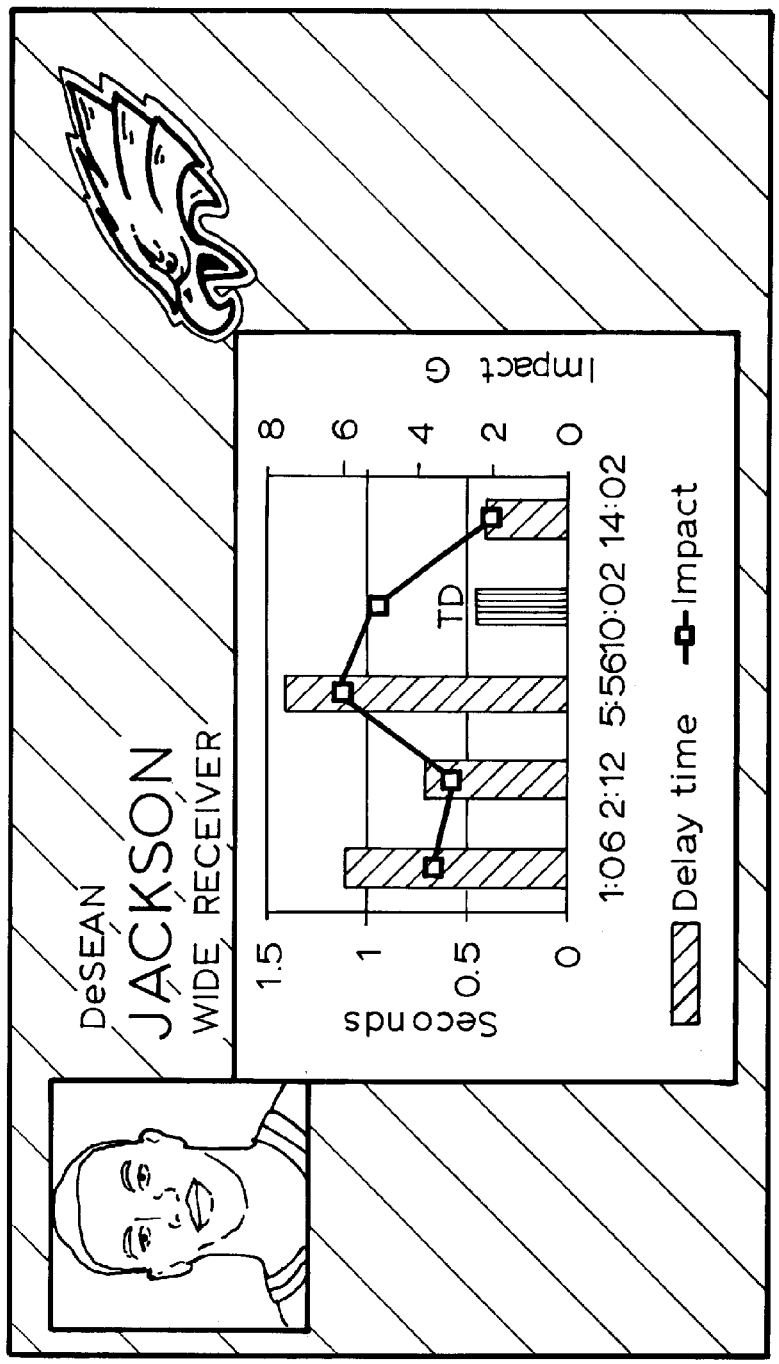
FIG. 6 illustrates the statistics of the defensive team on the receipt of the ball by a wide receiver.

FIG. 6 looks at the Jamming statistics in the performance of a wide receiver showing, the delays to the receivers route caused by jamming by opposition defenders. The graphical display may also highlight successful receives or touchdowns and show the moment of impact from a tackler. This can be defined by looking at the velocity of the wide receiver just prior to impact from the defender (where impact is measured by the accelerometer etc.), and then waiting to see when the wide receiver regains this velocity after getting past the defender. This is then the lost time, during the jam which is a measure of how disruptive the defender has managed to be to the wide receiver getting to his designated position for the play.

Figure 7:
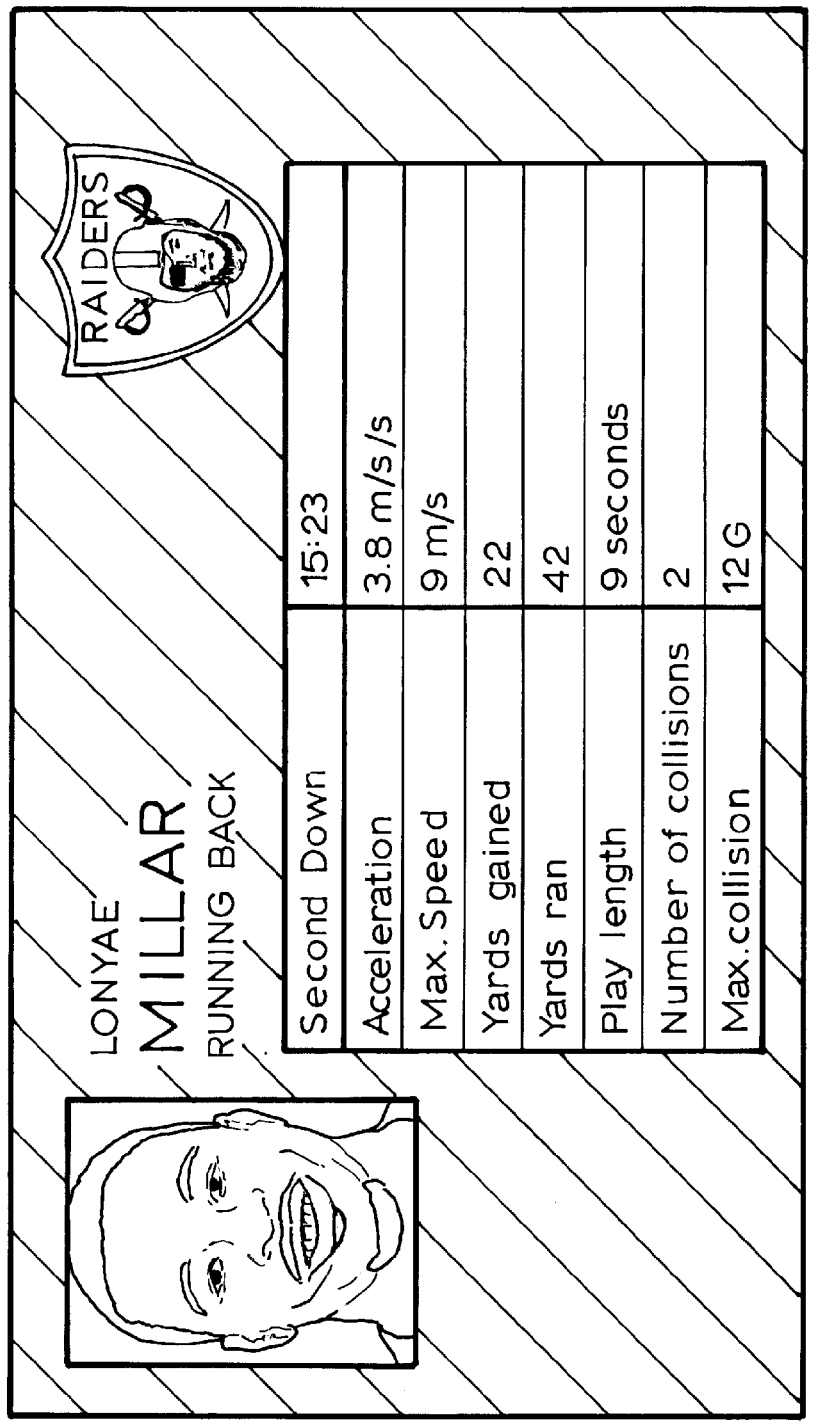
FIG. 7 shows a statistical breakdown of various aspects of the rushing plays of a running back.

FIG. 7 is similar to FIGS. 3 and 4 except it is designed for a running back to show acceleration, max speed, yards gained relative to the scrimmage line, yards run to reach that point, the number of collisions en route and the maximum collision force.

Figure 8:
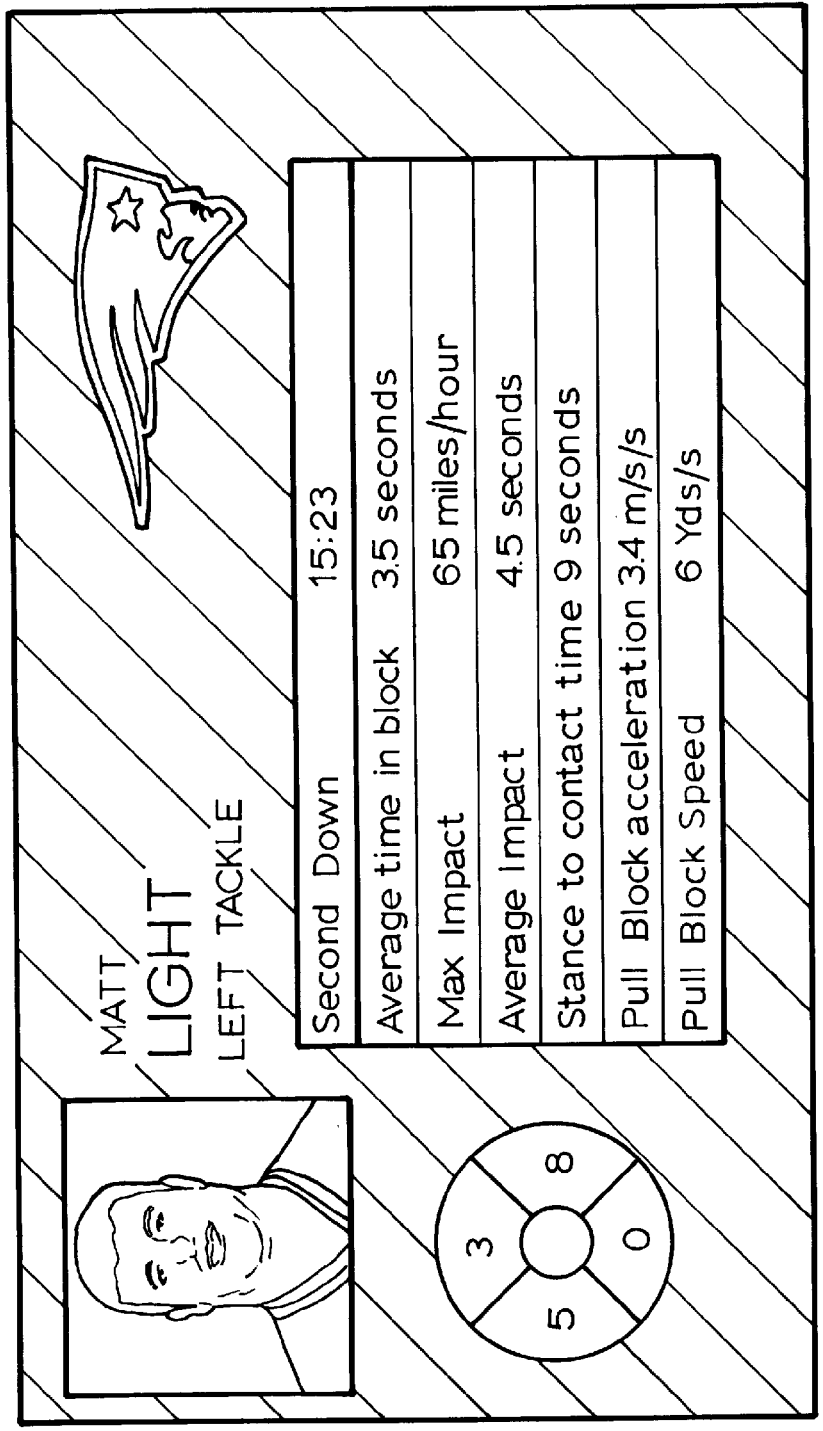
FIG. 8 shows a statistical breakdown of various aspects of the line man statistics of a Left Tackle player.

FIG. 8 is similar to FIGS. 3, 4 and 7 except it is designed for a left tackle showing for a particular play the length of the play, the time in block, the maximum impact, stance to contact time, pull block acceleration and pull block speed.

Figure 9:
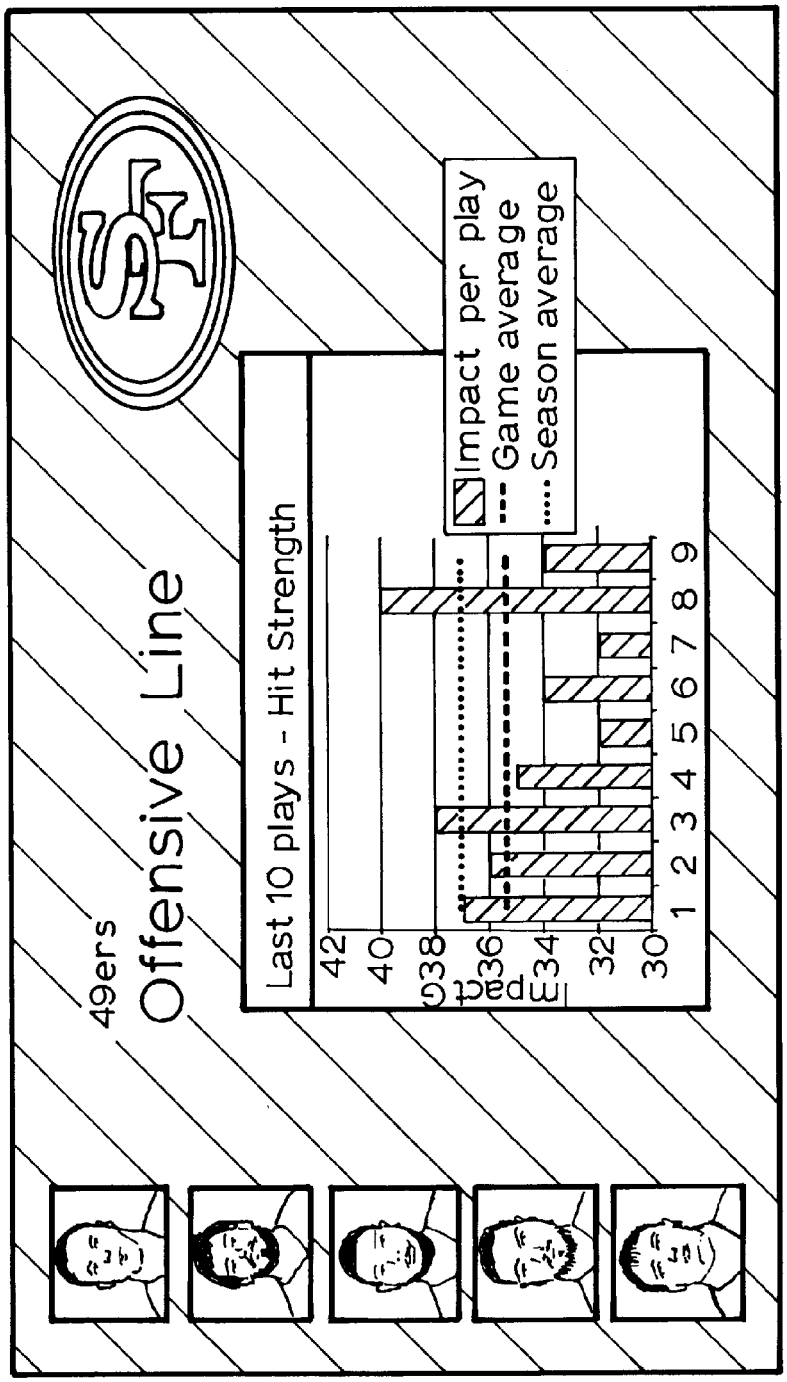
FIG. 9 shows a statistical breakdown of the hit strength of an offensive line.

FIG. 9 is similar to FIGS. 3, 4, 7 and 8 except it is designed to show the hit strength or impact per play statistics for an offensive line of players. For the linemen, measuring their displacement after contact is an interesting, statistic. Depending on the play, all the linesmen on both sides will move forward or backwards before they impact each other. But after that impact, they are each trying to push through their opposing player. So the distance and direction after impact is critical in understanding who is winning this battle. Again this can be accumulated over a number of plays.

Figure 11:
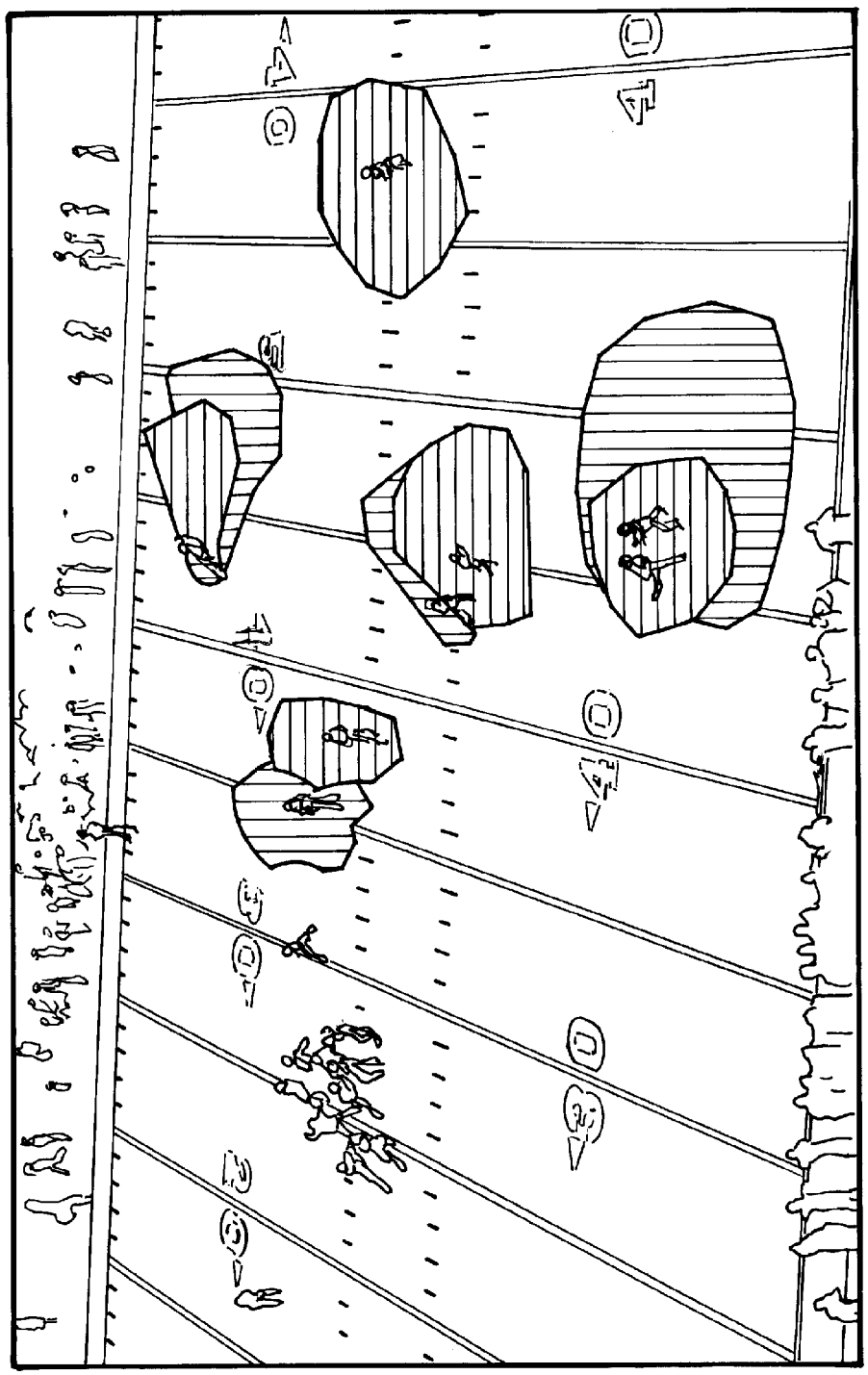
FIG. 11 illustrates the graphical representation of effective coverage area.
Figure 12:
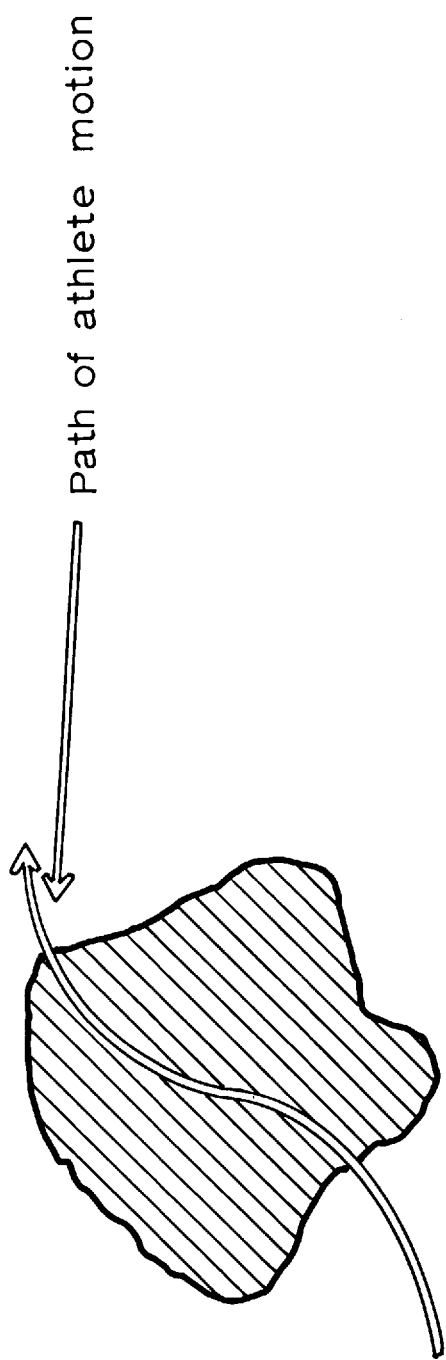
FIG. 12 illustrates the information to be obtained from the analysis of effective coverage area.

FIGS. 11 and 12 illustrate the display of effective coverage area. The object is to measure and display the effective range that an athlete can cover if the ball were passed in their direction, based on the input parameters.

Input Parameters
Current speed of the athlete
Distance from the ball
Acceleration ability of the athlete considering their current speed
Direction athlete is facing
Passing velocity of player with the ball
Output display An area under the athlete is drawn to show the range that they can cover if the ball were thrown to them at that point in time. In FIG. 11 The Offense receivers areas are shown in hatching to display the areas of the field where the QB can throw the ball and only his receivers can get to the ball. The areas where the defenders can effectively cover are crosshatched.

The display of effective coverage provides the viewer with the ability to see which receivers have the largest effective range and also where the passer of the ball should be targeting for that receiver. This display combined with animation of opposition players gives the audience a real view of effective passing windows. It also allows the audience to see if athlete is able to reproduce their maximum performance potential. The display may be used on any player who can influence play downfield. (WR, CB, S. TE, LB, RB—if RB is out of the backfield)

Figure 13:
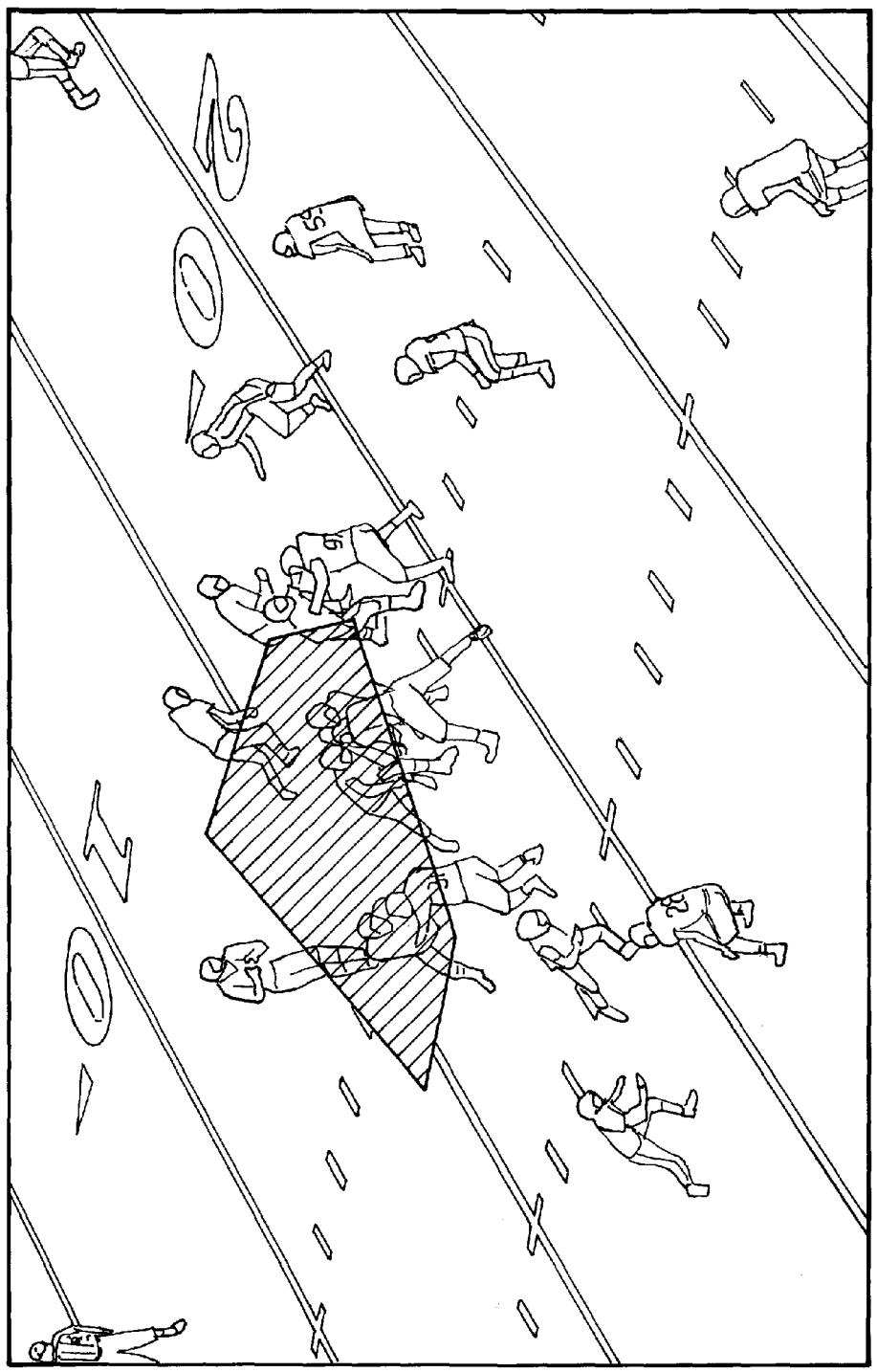
FIG. 13 illustrates a screen display for pocket analysis.

In FIG. 13 the display for pocket analysis is shown. The definition of pocket is the area that is behind anyone who is lined up on the line of scrimmage and does not go more than 2 yrds in front of the line after the ball is snapped.

A pocket is considered collapsed once an opposition player gets on the QB side of the border of the offensive players,—this could be triggered by a defender pushing past their opponent or by the QB running outside the border of the pocket.

In the case of a defender penetrating the border of the pocket, the system will log where this penetration took place and how long the pocket was held.

The system may report the closest player to the point of penetration.

The system may report the size of the pocket at the positional sampling frequency.

These metrics will be logged historically and max/min/average may be recorded.

Figure 14:
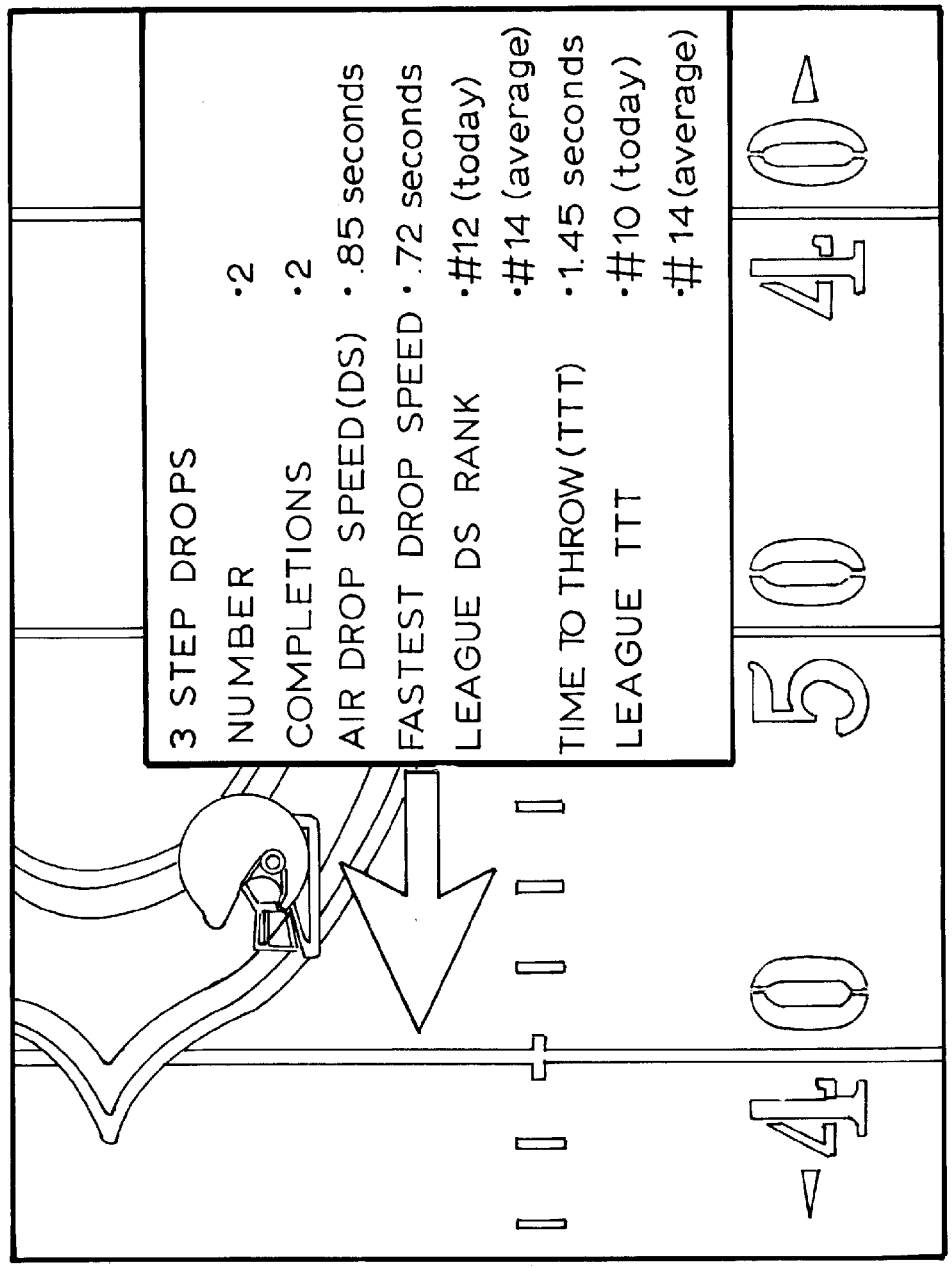
FIG. 14 illustrates a screen display of quarterback analysis.

Quarter back effectiveness able to be displayed as shown in FIG. 14. The objective is to valuate QB dropback effectiveness, time, efficiency and time in throwing position and pocket time, among other things, based on the input parameters.

Input Parameters
Current speed of the QB
Possession status of the QB
Footfall patterns of the QB
Position of the QB relative to the tackles and tackle box
Facing direction of the QB
Peak Rotation of the QB
Position of the Linemen relative to each other
Output Parameters
Time from possession to finish drop back
Steps taken in drop back
Time spent in pocket
Time pocket held
Pocket penetration point
Pocket size
Time from possession to scramble or throw
Peak Rotation This analysis provides the coach and viewer with the ability to compare QB effectiveness. This makes highly technical, subjective concepts more measurable, relatable and comparable and gives the viewer the ability to clearly see and evaluate the performance of the Offensive line. This display also allows the viewer to physically see the relationship between offensive line performance and QB positioning, performance and opportunity to perform.

Figure 10:
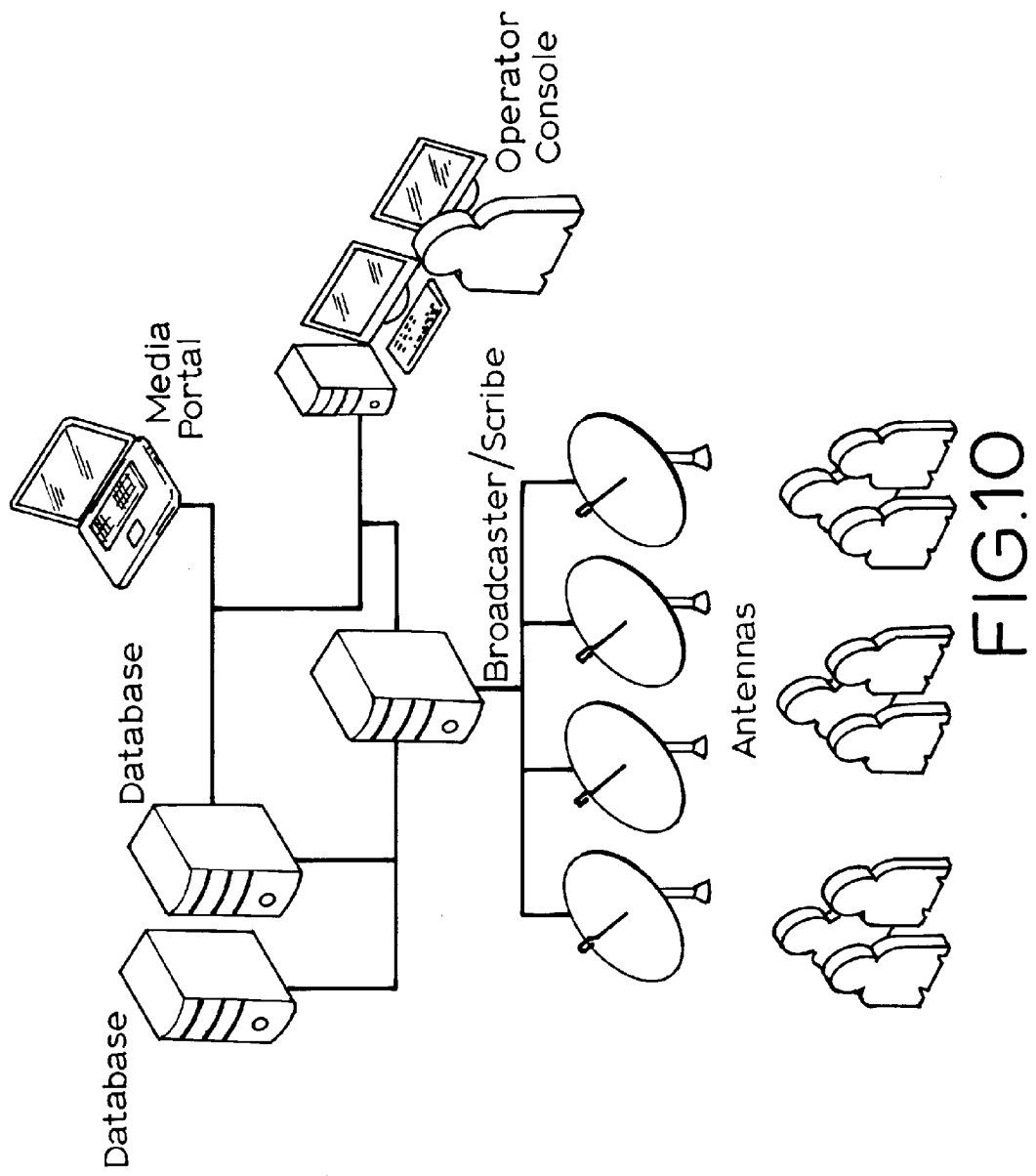
FIG. 10 is a schematic view of a preferred embodiment of the system for broadcasting of games.

With reference to FIG. 10 the venue in which the sporting event is to take place is, in this preferred embodiment, fitted with four directional antennas carefully placed to provide optimal RF coverage of the field. Additionally GPS positions of key locations on the field [goal lines] are carefully measured and recorded.

All athletes at the event are equipped with data logger units described in U.S. Pat. Nos. 7,715,982 and 8,036,826 which have been calibrated for the location and ideally positioned on their person to receive the best possible GPS information.

During the event the data loggers gather GPS positional information which is continuously validated to create accurate snapshots of the athletes actions on the field. GPS can generate false movement events which the datalogger discards internally. The information is put into encrypted data packets broadcast over RF.

The venues antennas gather all the information in their field of view and relay it over cable to the systems Broadcaster software.

The Broadcaster rejects duplicate information and retransmits the relevant data over a TCP/IP connection on the venues local network.

The system Operator Console opens a port to this broadcast and transforms the GPS information into a field relative coordinate system which can then be used to display a live feed of every athlete's position on a virtualized field.

In parallel to the Operator Console the system Data Scribe also creates a connection to the broadcaster and transcribes the data to local and remote MySQL databases. Note that multiple scribes are run to reduce the risk of critical data loss should there be machine failure.

Finally the user of the Operator console is charged with tracking all game critical events: entering them into a MySQL database by way of a proprietary touch screen user interface which has been tailored for the given sport. Key of these events is timing information regarding the beginning and ending of plays or periods of play during the event.

Once an event has been marked in time by the user of the Operator Console the software is able to analyze the large volume of data recorded by the Data Scribe over this period. Hundreds of data points regarding athlete movement during a play are distilled down to a few dozen using a path reduction algorithm. The algorithm discards small movements in the same direction resulting in a route which conveys the needed information but using a web transfer friendly data size. The routes of each athlete are written in the MySQL database for use by the Media Portal.

The Media Portal is a system web service which allows the end user to request information from the event by specifying a variety of parameters including time period, athletes involved or team position (Running Backs, Forwards etc.) Routes from the request are pulled from the database for analysis.

Since the routes will have occurred in many different locations on the field the data must be normalized in order to be of use to the end user. The positional information stored at each route data point is transformed by subtracting the vector of the first point from each subsequent point in the route. Now all the routes from the request may be compared to one another allowing analysis regarding the frequency, speed, and shape of the routes.

From the above it can be seen that this invention provides a unique and significant improvement in the presentation of statistical information for coaches and spectators.

Those skilled in the art will realise that this invention may be implemented in embodiments other than those illustrated without departing from the core teachings of this invention. In particular the invention may be adapted to American football and rugby league or rugby union where an offside line is used and the normalisation of team and player positions can be used to display and compare multiple plays.

The invention claimed is:

1. A system of collecting and displaying statistical performance data of football tactical plays which includes:
   a) player data loggers worn by each player that include accelerometers and location sensors that provide data on duration of play, acceleration, speed, direction of movement, possession of ball, force of impacts;
   b) a processor that collects data from the sensors and from other sources for a plurality of tactical plays and analyzes the data for each tactical play to determine i) an initial line of scrimmage for each tactical play, ii) the end of each tactical play, and (iii) for each player, one or more of start position and end position, duration of play, acceleration, speed, direction of movement, possession of ball, and force of impacts for each tactical play, the processor being programmed to normalize the collected and analyzed direction of movement data for each tactical play by subtracting a starting point vector from each subsequent point vector within the direction of movement data to generate normalized statistics, the starting point vector being based on one of the respective initial line of scrimmage or a respective player start point, so that all tactical plays and all individual player performances are comparable from the same start point using the normalized statistics; and
   c) display means to graphically display the normalized statistics for at least one of the tactical plays combined with video images of the at least one of the tactical plays and at least one of the players.

2. A system as claimed in claim 1 wherein the displayed normalized statistics include tactical plots of quarterback and receiver movements and distances travelled as well as ball movement; the plots are colour coded to show consequence of each play.

3. A system as claimed in claim 1 wherein the processor is programmed to normalize the collected data for player positions in the direction of play relative to the line of scrimmage and also at right angles to a direction of play.

4. A system as claimed in claim 1 which includes a ball tracking sensor in the ball, the processor further collects data from the ball tracking sensor.

5. A system as claimed in claim 1 wherein the processor is further programmed to perform statistical analysis on the normalized statistics with respect to the line of scrimmage, the statistical analysis indicating one of the performance of the scrimmage players on each team, including offensive line impact strengths for individual and multiple plays; individual line man statistics; and quarterback pass statistics per play, averaged over multiple plays for one game, one opponent, or all games, and wherein the displayed normalized statistics includes the statistical analysis.

6. A system as claimed in claim 1 wherein the displayed normalized statistics include receiver run statistics and running back rushing play statistics.

7. A system as claimed in claim 1 wherein the displayed normalized statistics include jamming statistics for individual players or teams.

8. The system as claimed in claim 1, wherein the video images of the at least one of the tactical plays and at least one of the players are virtualized video images.

9. The system as claimed in claim 1, wherein the display means graphically displays the normalized statistics comparing at least two of the tactical plays for at least one of the players combined with video images of the at least two of the tactical plays and at least one of the players.

* * * * *